(12) United States Patent
Al-Ghamdi et al.

(10) Patent No.: US 8,998,675 B2
(45) Date of Patent: Apr. 7, 2015

(54) REPELLENT BOARD

(75) Inventors: Ahmad Al-Khazim Al-Ghamdi, Riyadh (SA); Hossam Farag Ibrahim Abou-Shaara, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 14/008,578

(22) PCT Filed: Apr. 23, 2012

(86) PCT No.: PCT/EP2012/001735
§ 371 (c)(1),
(2), (4) Date: Sep. 30, 2013

(87) PCT Pub. No.: WO2012/150006
PCT Pub. Date: Nov. 8, 2012

(65) Prior Publication Data
US 2014/0242875 A1 Aug. 28, 2014

(30) Foreign Application Priority Data
May 2, 2011 (EP) .................................... 11003579

(51) Int. Cl.
A01K 47/06 (2006.01)
A01K 55/00 (2006.01)
A01K 51/00 (2006.01)

(52) U.S. Cl.
CPC ................. *A01K 47/06* (2013.01); *A01K 51/00* (2013.01)

(58) Field of Classification Search
CPC ................................ A01K 47/00; A01K 47/06

USPC ........................................ 449/2, 13, 14, 15, 52
See application file for complete search history.

(56) References Cited

U.S. PATENT DOCUMENTS 773,571 A * 11/1904 Kerr ................................. 449/24
2,261,298 A * 11/1941 Silver ............................. 449/15
3,394,426 A 7/1968 Knox

FOREIGN PATENT DOCUMENTS

HU 187967 3/1986

OTHER PUBLICATIONS

PCT/EP2012/001735; PCT International Search Report and Written Opinion of the International Searching Authority mailed Jun. 27, 2012.

* cited by examiner

*Primary Examiner* — Rob Swiatek
(74) *Attorney, Agent, or Firm* — Renner, Otto, Boisselle & Sklar, LLP

(57) ABSTRACT

A device for expelling bees from a bee hive, the bee hive having a portion containing at least one bee frame, the device comprising: a board for covering the portion of the bee hive, the board having a bottom side to face towards said portion, the board further comprising an inlet for receiving an air flow and at least two outlet slits arranged at the bottom side for directing at least a part of the air flow into the portion of the bee hive, a conduit system connecting the inlet and the at least two outlet slits, the outlet slits extending over a length of the at least one bee frame.

19 Claims, 4 Drawing Sheets

REPELLENT BOARD

The present application is a U.S. National Stage Application based on and claiming benefit under 35 U.S.C. §371 of PCT/EP2012/001735, filed 23 Apr. 2012, which in turn claims priority to European Application No. 11003579.7, filed 2 May 2011, the entirety of both of which are hereby incorporated herein by reference.

The present invention relates to a device and a method for expelling bees from a bee hive, in particular, for expelling honey bees from a bee hive containing bee frames.

In order to collect honey from a bee hive, the beekeeper needs to remove the frames containing the honey from the bee hive. As the frames are usually populated by bees, it is necessary to first remove the bees from the frames. This is usually done by removing a top cover of the bee hive and taking out the frames. The frames are then shaken in order to remove the bees from the frames. This, however, requires a long time and, moreover, excites the bees and causes the death of many of them. In addition, the beekeeper is often stung during this procedure.

It is therefore desired to provide a possibility for removing bees from bee frames which is reasonably fast, avoids over-excitement of the bees and is safe to operate for the beekeeper.

The present invention, in particular, provides a device according to claim 1, a bee hive according to claim 13 and a method according to claim 15.

In more detail, the present invention provides a device for expelling bees from a bee hive, the bee hive having a portion containing at least one bee frame. The device comprises:

a board for covering the portion of the bee hive, the board having a bottom side to face towards said portion, the board further comprising an inlet for receiving an air flow and at least two outlet slits arranged at the bottom side for directing at least a part of the air flow into said portion of the bee hive, a conduit system connecting the inlet and the at least two outlet slits, the outlet slits extending over a length of the at least one bee frame.

The device of the present invention provides the opportunity to expel the bees from the bee hive before opening the bee hive. The device may be put on a bee hive and is adapted to provide an air flow from top to bottom through the portion of the bee hive containing the at least one frame. In particular, the device may be configured as a top cover for the bee hive. The bees inside the bee hive are driven by the air flow towards the bottom of the bee hive, where an entrance opening for bees is present in the bee hive. The bees are thus gently removed from the frames and expelled from the bee hive. After operation of the device, the majority of the bees has left the hive and the beekeeper may safely remove the frames.

In particular, the air flow directed into portion of the bee hive is from top to bottom. In addition, the air flow may be directed to pass over both sides of each of the at least one bee frame. Here, the term both sides refers to the sides of the frames into which the bees build their combs. The air flow may be directed as to pass through all gaps in a cross section of the portion of the bee hive not taken by the at least one bee frame.

The inlet is for connecting to a blower. The blower may comprise a manually operated or an electric blower as specified below.

The device is not adapted to control a temperature or humidity of the air flow into the bee hive. In particular, the device is not adapted to heat up or cool the air. Moreover, no substances are added to the air flow for affecting the bees. In particular, no smoke is added to the air flow. Thus, pollution of the bees and the honey is avoided. Moreover, no bee repellent chemicals substance is added. No chemical substance for treatment of the bees or parasites like, e.g. Varroa mites, is added to the air flow.

The outlet slits may extend uniformly. Alternatively or additionally, they may comprise one or more intermitting bridges. This renders the outlet slits mechanically more stable, in particular, if the conduit system comprises tubes. Alternative or additionally, the outlet slits may be tapered towards their ends. This facilitates control of speed at which the air flow leaves through the outlet slits.

The board may, in particular, be made of wood, plastic or metal. Preferably, the board is made of plywood. The bottom side of the board may have a length of between 30 cm and 100 cm, in particular between 40 cm and 65 cm and, preferably between 45 cm and 55 cm. Alternatively or additionally, the bottom side may have a width of between 20 cm and 60 cm, in particular between 30 cm and 50 cm, and preferably between 35 cm and 45 cm.

In a preferred embodiment, the device further comprises one, two or four handles attached to the board. This facilitates moving the device.

In a preferred embodiment, the conduit system further comprises between 2 and 20, in particular between 4 and 11 and preferably between 6 and 10 additional outlet slits for directing at least a part of the air flow into said portion of the bee hive.

Here, the number of outlet slits is increased for a more homogeneous distribution of the air flow directed into the portion of the bee hive.

Alternatively or additionally, the number of branch conduits may be equivalent to the number of bee frames in the bee hive plus one. In this embodiment, there is one outlet slit per gap including the outermost gaps between a respective one of the frames and an adjacent side wall of the bee hive. Here, the air flow passes over both sides of every frame in the bee hive.

Alternatively, the device may comprise two outlet slits per frame of the bee hive. Alternatively or additionally, each outlet slit may be arranged, such that the air flow is directed towards one side of a frame.

In a preferred embodiment, the conduit system comprises a main air conduit having said inlet, and a set of branch conduits, each branch conduit having at least one of said outlet slits, the main air conduit being connected to the branch conduits.

In this embodiment, the main air conduit is used to distribute the air flow received via the inlet to the set of branch conduits. The branch conduits then distribute the air flow into the portion of the bee hive. In particular, the outlet slits may be parallel to a longitudinal axis of the branch conduits.

The main air conduit and/or the branch conduits may, in particular, have a diameter of between 20 mm and 100 mm, in particular between 30 mm and 80 mm and preferably between 40 mm and 60 mm. The main air conduit may have a larger diameter than the branch conduits. Alternatively or additionally, the branch conduits and/or outlet slits may be tapered. This allows for a more homogenous pressure distribution along the branch conduits.

Additionally or alternatively, each of said outlet slits may extend over a length of the respective branch conduit. Here, the length of the branch conduit is efficiently used to provide a maximum longitudinal extension of the air flow.

In a preferred embodiment, each branch conduit has a first and a second end, the branch conduits being connected to the main air conduit at their first ends or at a center between their first and second ends.

Being connected at the first end of the branch conduits, the main air conduit may conveniently be located at one end of the board. Alternatively, the branch conduits may be connected to the main air conduit near the center between their first and second ends. This embodiment leads to a symmetrical air pressure distribution inside the branch conduits.

In a preferred embodiment, the branch conduits extend transverse, in particular, perpendicular to the main air conduit. In this embodiment, the connection length of the main air conduit between adjacent branch conduits is minimized, such that less air pressure is needed at the inlet of the main air conduit to supply air to all of the branch conduits.

According to a preferred embodiment, the conduit system is at least partially integrated into the board. In embodiments with a main air conduit and branch conduits, the main air conduit and/or the branch conduits may be integrated into the board. This embodiment leads to a compact arrangement of the device minimizing a risk of the device being damaged.

In a preferred embodiment, the conduit system is at least partially attached to the bottom side of the board. In embodiments with a main air conduit and branch conduits, the main air conduit and/or the branch conduits may be attached to the bottom side of the board. In this embodiment, the conduit may be easily arranged at the bottom side of the board. In particular, the conduit may be glued to the bottom side of the board.

In a preferred embodiment, the conduit system comprises at least one tube. The tube may, e.g. comprise a plastic tube. Tubes are usually readily available in areas in which bee hives are used. Moreover, a standard knife may be used to easily provide outlet slits. In embodiments with a main air conduit and branch conduits, the main air conduit and/or the branch conduits may comprise at least one tube.

According to a preferred embodiment, the inlet is arranged at a top side or a lateral side of the board. This allows for easy access to the inlet from outside the bee hive during operation.

Alternatively, the inlet of the main air conduit may be arranged at the bottom side of the board. This is preferred if a blower adapted to be operated inside the bee hive is connected to the inlet as is provided in an embodiment of the present invention.

According to a preferred embodiment, the device further has an outlet arranged at a top side or a lateral side of the board. In this embodiment, several devices according to the present invention may be used connected in series. Here, only one blower is needed for operation of more than one device. The air is blown into one of the boards by a blower via the inlet, passes through that board and leaves via the outlet. Thus, an airflow through a series of devices is caused.

Alternatively or additionally, the inlet and/or outlet of the main air conduit may comprise connecting means for connecting to a blower. The connecting means may, e.g. comprise a thread, a screw, locking means, latching means and/or clamping means.

According to a preferred embodiment, the outlet slits have a width of between 3 mm and 20 mm, in particular between 5 mm and 15 mm and, preferably, between 8 mm and 12 mm.

Having a width in that range, the outlet slits generate a wide enough airflow inside the bee hive for reaching most bees. Moreover, the outlet slits are still narrow enough such that the pressure inside the main air conduit and the branch conduits does not fall off too quickly, such that the airflow reaches the end of the conduits.

In a preferred embodiment, adjacent outlet slits are spaced at a distance of between 10 mm and 100 mm, in particular between 15 mm and 60 mm and, preferably between 25 mm and 40 mm. This leads to an evenly distributed air flow inside the bee hive, passing both sides of the frames.

In a preferred embodiment, the device further comprises protection means arranged at the outlet slits for preventing the bees entering the conduit system. The protection means may comprise, e.g. a mesh, a net or wires. Openings in the protection means may be dimensioned such that bees cannot pass through. This prevents bees from entering the branch conduits and blocking the conduits.

Alternatively or additionally, the outlet slits extend parallel to each other. This is preferred as the device provides a symmetric air flow distribution in the bee hive.

In a preferred embodiment, the outlet slits extend parallel to the frames inside the bee hive to fit with the actual space between frames. This leads to a more symmetric air flow distribution within each gap between each two adjacent bee frames.

According to a preferred embodiment, the device further comprises a manual blower connected to the inlet. Using a manual blower rather than an electric blower provides a better control of the air flow intensity. Here, the rate of air blowing in may be controlled depending on an observed reaction of the bees.

According to a preferred embodiment, the device comprises an electric blower connected to the inlet. This is, in particular, preferred if the device has an outlet for connecting to an additional device. An electric blower allows higher rates of air flow blowing into the inlet. The electric blower may, in particular, be adapted to blow in air into the inlets of more than one device connected in series or in parallel.

In a further aspect, the present invention provides a bee hive comprising the device of the aforementioned type. In particular, the bee hive may comprise the device of the aforementioned type as a cover with the bee hive further comprising an entrance opening for the bees arranged at a bottom thereof. Here, the device provides an airflow inside the bee hive which extends from the top of the bee hive to the bottom thereof. Hereby, the bees are driven from inside the bee hive towards the entrance opening, where they leave the hive.

In a preferred embodiment, the bee hive further has at least one bee frame and at least one of said at least two outlet slits of the device is further arranged for directing at least a part of the air flow to extend over a side of the bee frame. Preferably, two of the at least two outlet slits of the device are arranged for directing at least a part of the air flow to extend over a respective side of the bee frame.

In this embodiment, in a horizontal projection, the outlet slits may be parallel to the at least one bee frame. In a horizontal projection, two of the at least two outlet slits may be adjacent to the at least one bee frame, with one of the outlet slits on both sides of the frame, respectively.

In a further aspect, the present invention provides a method for repelling bees from a bee hive with at least one bee frame, in particular, using the device of the aforementioned type, the method comprising: providing an air flow from top to bottom inside the bee hive, the air flow extending over a side of the at least one frame. Preferably, the air flow extends over both sides to the at least one frame. Here, the air flow passes over a side of the frame for the bees to build their honey combs into. The air flow contacts the bees on the sides of the frame and drives them downwards. The air flow may be directed to fill an entirety of gaps in a horizontal cross section of the bee hive.

The strength of the air flow may be configured to drive the bees. This is in contrast to a soft air flow for mere ventilation of the bee hive, which is usually much weaker.

In a preferred embodiment, the method comprises:
  a) placing the device of the aforementioned type as a cover of the bee hive, b) connecting the inlet of the main air conduit to a blower,
c) operating the blower to blow air into the inlet of the main air conduit,
d) removing the device from the bee hive.

Additionally, step c) may further comprise operating the blower for between 60 s and 600 s, in particular between 120 s and 480 s and preferably between 180 s and 360 s.

The method may further comprise the step of
e) removing at least one frame from the bee hive and/or adding at least one additional frame to the bee hive.

Additionally, the method may use at least two devices of the aforementioned type and further comprise connecting the main air conduits of the at least two devices together. The connection may, in particular, be in parallel or in series. Alternatively or additionally, the method may comprise connecting the main air conduits of two or more devices of the present invention with one blower.

In the following further technical details and advantages of the present invention are described in terms of preferred embodiments.

Figure 1:
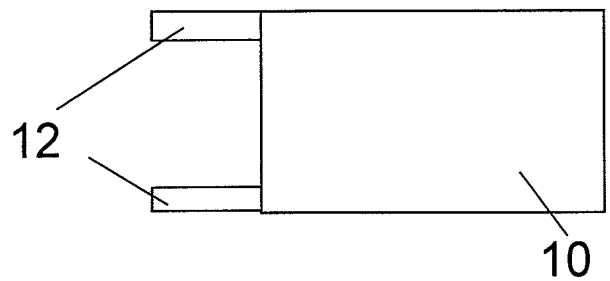
FIG. 1 shows a device according to a first embodiment of the present invention in top view.

FIG. 1 shows a device according to a first embodiment of the present invention in top view. The device comprises a rectangular board 10. At one end, the board is equipped with two handles 12. The handles 12 are parallel to each other.

Figure 2:
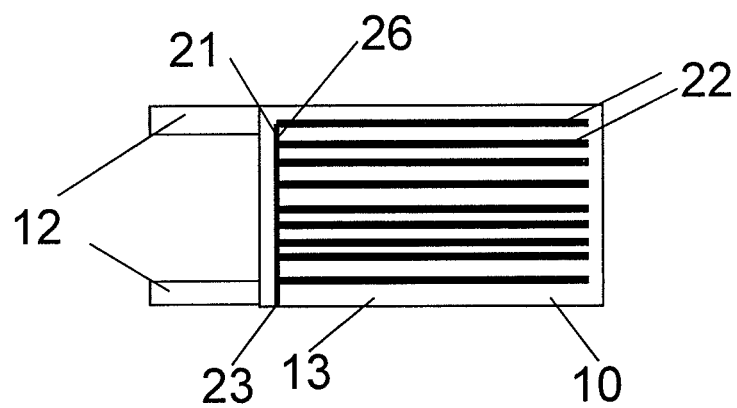
FIG. 2 shows the device of FIG. 1 from the bottom.

FIG. 2 shows the device of FIG. 1 in bottom view. Here, bottom side 13 of the board 10 is shown. Attached to the bottom side 13 of the board 10 is a main air conduit 21 which extends parallel to an edge of the board 10. In this embodiment, the main air conduit 21 neighbors the edge of the board 10 where the handles 12 are attached. The main air conduit 21 is a plastic tube attached to the bottom side 13.

The main air conduit 21 comprises an inlet 23. The inlet 23 is arranged at an edge of the board 10. The inlet 23 is arranged at a first end of the main air conduit 21. A second end of the main air conduit 21 opposite the end with the inlet 23 is closed. The device of FIG. 2 further comprises nine branch conduits 22. The branch conduits 22 extend parallel to each other. In the embodiment of FIG. 2, adjacent branch conduits 22 are arranged at different distances. This is preferred if the frames inside the bee hive are not evenly spaced, but have different distances between each other.

The branch conduits 22 are plastic tubes attached to the bottom side 13 of the board 10. In more detail, the branch conduits 22 are glued to the bottom side 13.

The branch conduits 22 have identical lengths. Moreover, each branch conduit 22 has a first end 26 which is connected to the main air conduit 21. Each branch conduit 22 further has a second end opposite the first end 26 which is closed. Moreover, each branch conduit 22 has an outlet slit (not shown) extending between the first end 26 and the second end thereof. Moreover, the outlet slits of each branch conduit 22 extends along a longitudinal axis of the branch conduit. The outlet slits extend over a length of the frames in the bee hive.

The device is not adapted to increase the temperature of air blown into the inlet of the main air conduit before the air is blown into the bee hive. Moreover, the device is not adapted to increase a humidity of the air blown into the bee hive.

Figure 3:
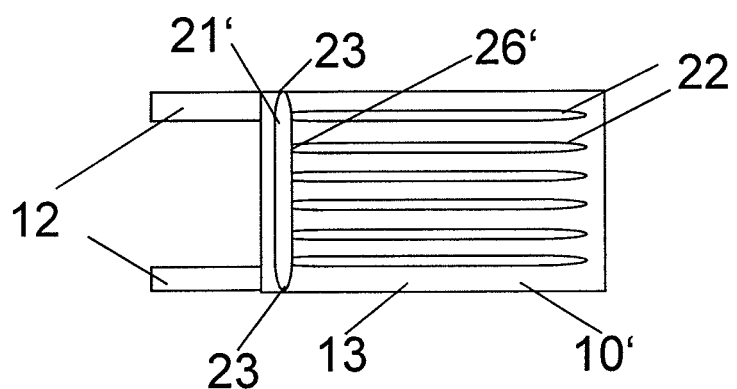
FIG. 3 shows a device according to a second embodiment of the present invention from the bottom.

FIG. 3 shows a device according to a second embodiment of the present invention in bottom view. The device comprises a board 10' with two handles 12 attached at a side thereof. The device comprises a main air conduit 21'. The main air conduit 21' extends from one edge of the board 10' to an opposite end thereof. In particular, the main air conduit 21' has a first and a second end, generally indicated by reference numeral 23. Each of the first and second ends 23 may interchangeably be used as an inlet or an outlet. In this embodiment, a blower may be connected to one of the openings 23 acting as an inlet, while a main air conduit of a second device may be connected to the other opening 23 thus acting as an outlet.

The device of FIG. 3 further has six branch conduits 22 extending parallel to each other and having the same length. The branch conduits 22 have first ends 26' and a second ends. The branch conduits 22 are connected to the main air conduit 21' at their first ends 26'. The branch conduits 22 are evenly spaced.

Figure 4:
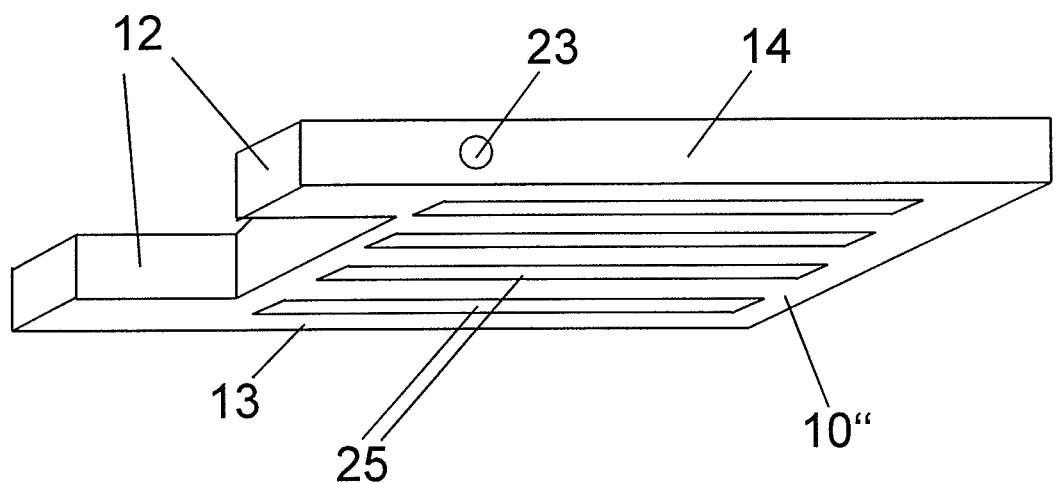
FIG. 4 shows a perspective view of a device according to a third embodiment of the present invention.
Figure 4:
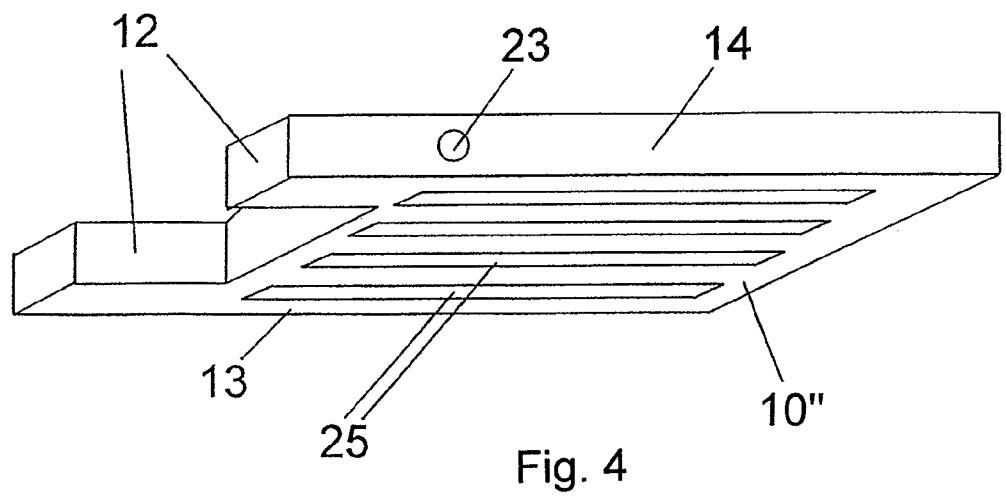

FIG. 4 shows a perspective view of a device according to a third embodiment of the present invention. The device of FIG. 4 comprises a board 10" with two handles 12 arranged at one lateral side thereof. The device has four branch conduits being incorporated into the board 10". The branch conduits have outlet slits 25 arranged at a bottom side 13 of the board 10". In this embodiment, the branch conduits are integrated into the board 10", such that no additional elements reach out below the bottom board, thus preventing damage of the device.

Further, the device of FIG. 4 has a main air conduit integrated into the board 10". The main air conduit has an opening 23 arranged at a lateral side 14 of the board.

Figure 5:
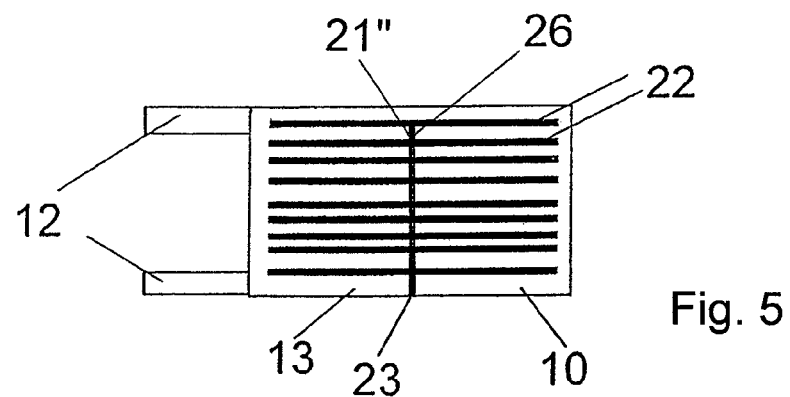
FIG. 5 shows a device according to another embodiment of the present invention, from the bottom, similar to FIG. 2.

FIG. 5 shows a device according to another embodiment of the present invention, from the bottom, similar to FIG. 2, but in which a main conduit 21" is shown in a center position, rather than the main conduit 21 being at the left-hand end, as shown in FIG. 2.

Figure 6:
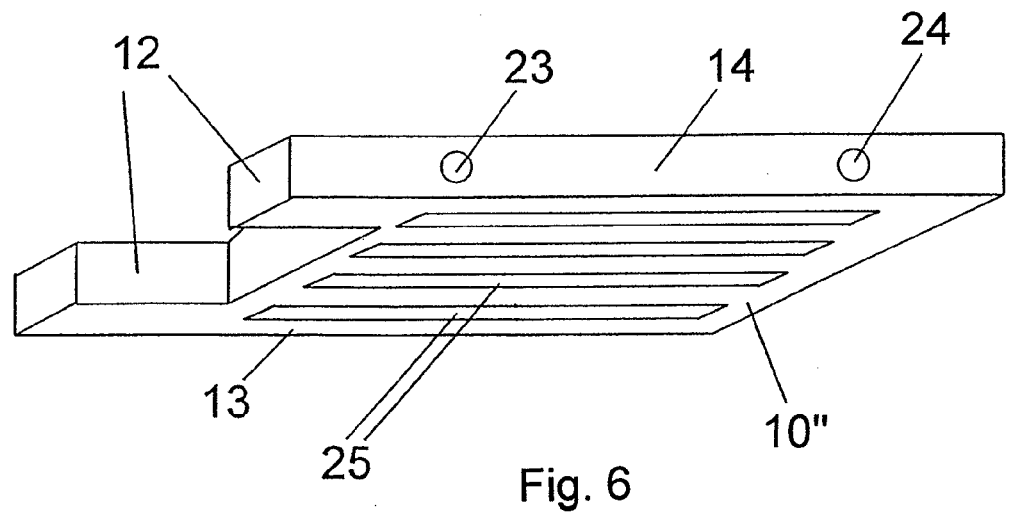
FIG. 6 shows a device according to another embodiment of the present invention, from the bottom, similar to FIG. 4.

FIG. 6 shows a perspective view of a device according to another embodiment of the present invention, from the bottom, similar to FIG. 4, in which an outlet 24 is shown on a lateral side 14 of the board 10", near the opening 23.

Figure 7:
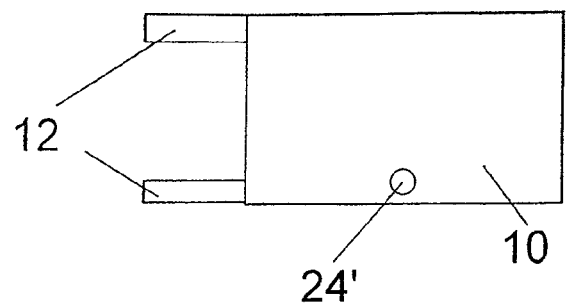
FIG. 7 shows a device according to another embodiment of the present invention, from the bottom, similar to FIG. 1.

FIG. 7 shows a device according to another embodiment of the present invention, from the top, similar to FIG. 1, in which an outlet 24' is shown on the top or upper side of the board 10.

Figure 8:
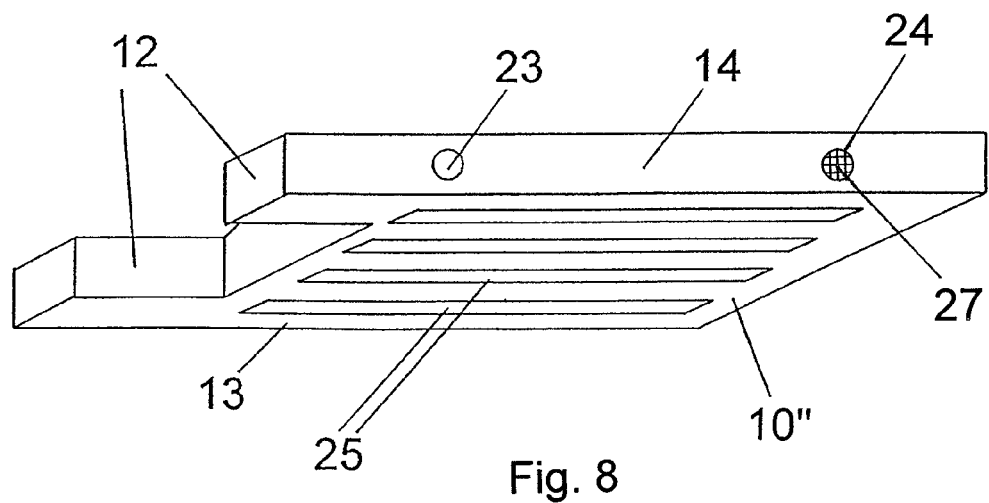
FIG. 8 shows a device according to another embodiment of the present invention, from the bottom, similar to FIG. 4 and FIG. 6.

FIG. 8 shows a perspective view of a device according to another embodiment of the present invention, from the bottom, similar to FIG. 4 and FIG. 6, in which an outlet 24 is shown on a lateral side of the board 10" and the outlet 24 is covered by a screen 27 as a protection means for preventing bees from entering the conduit system.

REFERENCE NUMERALS 10, 10', 10" board
12 handle
13 bottom side
14 lateral side
21, 21' main air conduit
22 branch conduit
23 inlet
25 outlet slit
26, 26' first end

The invention claimed is:

1. A device for expelling bees from a bee hive, the bee hive having a portion containing at least one bee frame, the device comprising:
a board covering the portion of the bee hive,
the board having a bottom side to face towards said portion,
the board further comprising an inlet for receiving an air flow
and at least two outlet slits arranged at the bottom side for directing at least a part of the air flow into said portion of the bee hive,
a conduit system connecting the inlet and the at least two outlet slits,
the outlet slits extending over a length of the at least one bee frame.

2. The device of claim 1, the conduit system further comprising between 2 and 20 additional outlet slits for directing at least a part of the air flow into said portion of the bee hive.

3. The device of claim 2, wherein the conduit system comprises a main air conduit having said inlet, and a set of branch conduits, each branch conduit having at least one of said outlet slits, the main air conduit being connected to the branch conduits.

4. The device of claim 3, wherein each branch conduit has a first and a second end, the branch conduits being connected to the main air conduit at their first ends or at a center between their first and second ends.

5. The device of claim 4, wherein the branch conduits extend transversely to the main air conduit.

6. The device of claim 1, wherein the conduit system comprises a main air conduit having said inlet, and a set of branch conduits, each branch conduit having at least one of said outlet slits, the main air conduit being connected to the branch conduits.

7. The device of claim 6, wherein each branch conduit has a first and a second end, the branch conduits being connected to the main air conduit at their first ends or at a center between their first and second ends.

8. The device of claim 7, wherein the branch conduits extend transversely to the main air conduit.

9. The device of claim 6, wherein the branch conduits extend transversely to the main air conduit.

10. The device of claim 1, wherein the conduit system is at least partially integrated into the board.

11. The device of claim 1, wherein the conduit system is at least partially attached to the bottom side of the board.

12. The device of claim 1, wherein the conduit system comprises at least one tube.

13. The device of claim 1, wherein the inlet is arranged at a top side or a lateral side of the board and/or wherein the device further has an outlet arranged at a top side or a lateral side of the board.

14. The device of claim 1, wherein the outlet slits have a width of between 3 mm and 20 mm.

15. The device of claim 1, wherein adjacent outlet slits are spaced at a distance of between 10 mm and 100 mm.

16. The device of claim 1 further comprising protection means arranged at the outlet slits for preventing the bees entering the conduit system.

17. A bee hive comprising the device of claim 1.

18. The bee hive of claim 17, further having at least one bee frame and at least one of said at least two outlet slits of the device being further arranged for directing at least a part of the air flow to extend over a side of the bee frame.

19. A method for repelling bees from a bee hive, the bee hive having a portion containing at least one bee frame, the method using the device of claim 1, the method comprising:
providing an air flow from top to bottom inside said portion of the bee hive, the air flow extending over a side of the at least one frame.

* * * * *